United States Patent [19]
Diaz et al.

[11] 4,415,525
[45] Nov. 15, 1983

[54] HETEROGENEOUS GAS CORE REACTOR

[75] Inventors: Nils J. Diaz; Edward T. Dugan, both of Gainesville, Fla.

[73] Assignee: University of Florida, Gainesville, Fla.

[21] Appl. No.: 184,134

[22] Filed: Sep. 4, 1980

Related U.S. Application Data

[63] Continuation of Ser. No. 961,379, Nov. 16, 1978, abandoned.

[51] Int. Cl.$^3$ .............................................. G21C 1/10
[52] U.S. Cl. ...................................... 376/317; 376/319
[58] Field of Search ................ 376/319, 356, 458, 317

[56] References Cited

U.S. PATENT DOCUMENTS 2,990,354  6/1961  Anderson et al. .................. 376/319
3,050,454  8/1962  Barr et al. ........................... 376/356
4,075,057  2/1978  Fletcher et al. ..................... 376/319

Primary Examiner—Sal Cangialosi
Attorney, Agent, or Firm—Arthur G. Yeager

[57] ABSTRACT

A heterogeneous gas core nuclear reactor comprising a core barrel provided interiorly with an array of moderator-containing tubes and being otherwise filled with a fissile and/or fertile gaseous fuel medium. The fuel medium may be flowed through the chamber and through an external circuit in which heat is extracted. The moderator may be a fluid which is flowed through the tubes and through an external circuit in which heat is extracted. The moderator may be a solid which may be cooled by a fluid flowing within the tubes and through an external heat extraction circuit. The core barrel is surrounded by moderator/coolant material. Fissionable blanket material may be disposed inwardly or outwardly of the core barrel.

20 Claims, 7 Drawing Figures

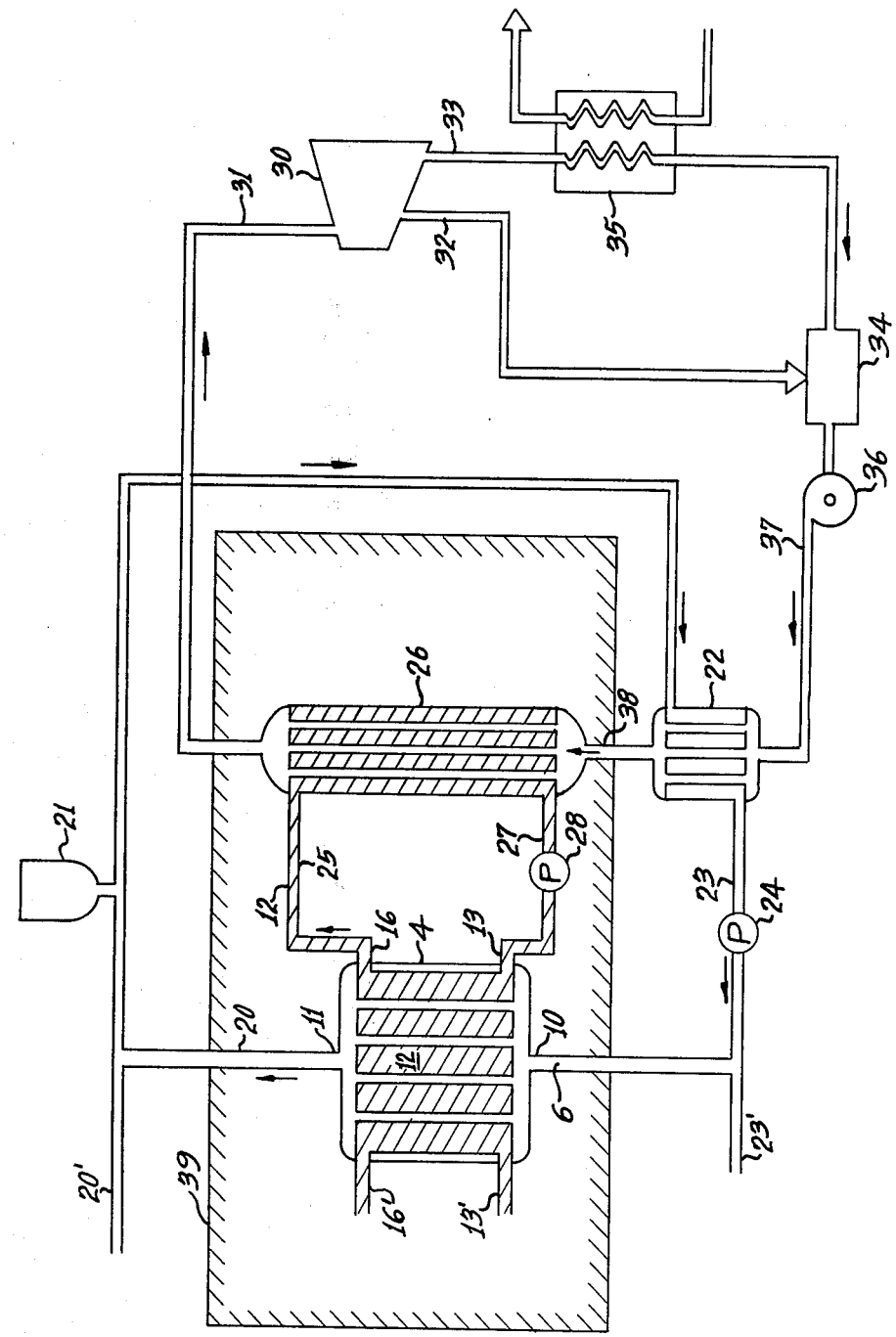

HETEROGENEOUS GAS CORE REACTOR

This is a continuation of application Ser. No. 961,379, filed Nov. 16, 1978 now abandoned.

BACKGROUND OF THE INVENTION

Solid-fueled and liquid-fueled "heterogeneous" nuclear reactors have already undergone extensive analysis and development. Gas-fueled nuclear reactor studies, however, have been restricted to either (a) homogeneous core systems, (b) large separate regions of fuel and moderator, or (c) concentric rings of fuel-moderator arrangements.

The arrangement of bundles of moderator cells or moderator/coolant channels arrayed in a fissionable gas or mixture of gases makes a truly heterogeneous nuclear reactor core. It is this core heterogeneity for a gas-fueled reactor which accounts for the novelty of this concept and leads to significant advantages, especially with respect to previous gas core systems. There are a number of advantages of the invention over solid fuel reactors. The fuel fabrication is essentially eliminated, which will reduce the fuel cycle cost. The requirements for engineering safeguards, especially the emergency core cooling system can be greatly reduced due to the inherent safety of an expanding gaseous fuel. Other advantages associated with gas-fueled reactors are high fuel utilization, simple fuel management, the possibility of continuous fission product removal, the possibility of continuous fuel recharge, high thermal efficiency and a reduction in nuclear weapon proliferation probability. In addition, one of the differentiating characteristics of this heterogeneous gas core reactor is its peculiar unit cell, in which the moderator is inside and the fuel is outside. Use of this arrangement results in less structural material and this leads to a better fuel and neutron economy, power distribution and reactor control. The present reactor is adaptable and flexible to conform to desired optimum conditions and to various specific applications.

A reactor system in accord with the invention further provides enhanced heat transfer characteristics. The present reactor makes use of minimal structural material for the moderator-containing tubes and is of compact design. The invention contemplates flexible and effective control possibilities. The capability to remove the fission generated energy from the heterogeneous gas core reactor core is notably better than that from a corresponding size homogeneous gase core reactor. This is not only because of the possibility of dual heat removal but also because of superior in-core heat transfer characteristics resulting from the core heterogeneity itself. This capability can be augmented by introducing vortices, swirl motion, buffer gases or various flow patterns as is deemed necessary.

Since the gaseous fuel is also a working fluid, a core coolant is not required to remove all the thermal energy from the core. Therefore, a core coolant, if used, can be operated at comparatively low pressures, and may be dispensed with entirely under some circumstances.

Due to the high operating temperature of the fuel, the overall efficiency of the present reactor can be as high as 40-50% depending on the design of the energy conversion system.

Unlike solid-fueled reactors, there are no significant problems associated with fuel rod swelling, hydriding and fuel melting in an HGCR. Materials related problems are, in this invention, associated primarily with the moderator channel rather than with the fuel. Therefore, this system can achieve much higher levels of fuel utilization than with other reactor concepts. In the present invention, almost all the fissile material can be utilized by blending depleted fuel with fresh fuel. The present reactor can be designed to attain a fuel utilization which is substantially greater than for other reactor concepts.

Due to the gaseous form of the fuel, its fabrication charge is eliminated. Also reprocessing costs will be greatly reduced and waste disposal simplified and reduced in magnitude.

Since recharging of the fuel can be accomplished simply by blending depleted fuel with fresh fuel, complicated fuel management programs such as exist for solid-fueled reactors are unnecessary.

Continuous fission product removal during gas cleanup operations decreases the initial inventory of the fuel and reduces the requirements of the total reactivity control elements. Also, the primary side contains a largely reduced inventory of radioactive fission products, to provide a beneficial impact on safety.

An HGCR with circulating gaseous fuel makes "continuous" or frequent fuel recharge possible. Fresh gaseous fuel can be added in a continuous or batch mode to the circulating fuel in the primary loop to keep the system functioning (with the required excess reactivity) without necessitating reactor shutdown.

In a heterogeneous gas core reactor, a sophisticated emergency core cooling system is unnecessary. The inherent safety of an expanding gaseous fuel can be engineered to replace many of the functions of other safeguard systems.

The high neutron flux in a heterogeneous gas core reactor permits induced nuclear transmutation of radioactive products or wastes. Induced nuclear transmutation of radioactive wastes is a process whereby long-lived radioactive wastes or products are converted into relatively harmless, short-lived or stable nuclides. This nuclear transmutation can significantly simplify the long-time, high level radioactive waste disposal problem.

The methods of energy conversion and/or utilization from this invention can range from the conventional steam cycles such as shown herein to, possibly, gas turbines or direct energy conversion schemes or to other applicable methods of utilization. Energy can be extracted or transferred from the hot core gas, from the in-core moderator/coolant materials, from the surrounding out-of-core moderator/reflector, from a blanket or blanket regions if so desired, from mechanical shaft power from pulsed versions of the basic concepts of the invention, or from nuclear pumped lasers.

The invention has great flexibility in that a variety of moderator and coolant materials are found to be quite acceptable.

The invention has great flexibility in that a wide variety of gaseous fuel mixtures consisting of both fissionable and non-fissionable gases are found to be effective.

A variety of reactor containment schemes are readily adapted for this invention.

A variety of core barrel and pressure vessel materials are found to be suitable for this invention.

The core (or multiple cores) are adapted to be surrounded by a suitable moderator/reflector material, a fissionable (fertile and/or fissile) blanket and shield regions if deemed necessary.

A central zone comprising, for example, moderator, void and actinide wastes, may be provided so that the reactor becomes an "annular core" reactor.

Fissionable material in other than gaseous form can be added to the core for the purpose of conversion, or breeding, or for augmenting the power producing capabilities.

A variety of methods are available in the reactor according to the invention for power flattening. These include conventional techniques along with some techniques which are quite different from those used in conventional reactors. For example, the spacing between coolant channels or cells can be varied in such a manner as to achieve power flattening. Power peaks occur at the highest temperature, and the peaks in the present reactor are flattened by providing moderator tubes less widely spaced in the high power regions of the core than in the lower power regions. This may be accomplished in this manner whether heat extraction exteriorly of the core is primarily from gaseous fuel medium or from circulating core coolant, such as circulating coolant gas circulated through graphite moderator material contained in the tubes, or from circulating light water moderator coolant. This method is very effective and does not suffer the harmful side effects often associated with conventional power flattening techniques. Peak-to-average flux ratios obtained for this invention are lower than for other power reactors.

The fact that the fuel is in a gaseous state and circulating adapts the reactor to a variety of control and burnup compensation methods which are not readily available with conventional reactors. Fuel and/or coolant flow rate changes, spectrum shifts, variations in fuel gas density and/or temperature, variations in gaseous fuel loop circulation time, fission product concentration changes and continuous or batch fuel blending procedures can all be used to minimize or eliminate the need for burnable poisons or control rods as a means for power level control and burnup compensation.

The invention has great flexibility in that it can readily function for a variety of geometries; these include but are not limited to cylindrical, spherical, slab and annular configurations.

The invention may readily be incorporated or combined with other energy generating schemes to form hybrid systems. An example is a fission/fusion device in which the fission region utilizes the principles embodied in this invention.

The gaseous fuel in the present invention lends itself to minimization of nuclear proliferation risk, and to accurate control and accounting of strategic material. The control and accounting can be performed on a batch or continuously monitored basis. The present reactor is an excellent burner of plutonium and can be used as a driver core for self-sustaining cycles. Additionally, by continuously separating selected fissile materials from the gas mixture, it is possible to maintain in-plant the plutonium and transuranium elements produced and thus enhance fuel utilization and minimize or eliminate out-of-plant plutonium handling. The invention contemplates that plutonium which is produced in the reactor will be recirculated until it is consumed.

Because of the efficient heat removal capabilities of the invention, it has a high power density, that is, the core size is small for any given megawatt capacity.

The reactor has potential not only for large electrical power generation but also for small (peaking) electricity generation. Nuclear reactors tend to be economically competitive only when the are incorporated into large capacity power systems. The fuel cycle cost of the present reactor and its less sophisticated engineered safeguards and auxiliary systems, make the present reactor competitive in smaller capacity power systems.

The reactor of this invention is able to better utilize neutronically the gaseous fuel in the core, particularly in the inner regions of the core, than other large gas core reactor concepts. The dispersion of moderator material through the core in bundles and the consequent reduction in selfshielding effects for the gaseous fuel are responsible for this improvement.

Because of the core power distribution, the efficient heat transfer and flow patterns, the invention is able to achieve better temperature distributions in the core and smaller temperature gradients.

The heterogeneous gas core reactor as described may be used for the burnup of radioactive waste materials by positioning rods of materials contained in tubular containers in the core or in the surrounding reflector or blanket region.

DETAILED DESCRIPTION OF THE INVENTION

These and other advantages and features of the invention will be apparent to those skilled in this art from the following disclosure, especially when considered in conjunction with the accompanying drawings, in which:

FIG. 6 is a schematic diagram of a heterogeneous gas core reactor power plant.

As noted above, the arrangement of bundles of moderator cells or moderator/coolant channels arrayed (but physically separated) in a fissionable gas or mixture of gases makes a truly heterogeneous nuclear reactor core. It is this core heterogeneity for a gas-fueled reactor which accounts for the novelty of this concept and leads to noted significant advantages over previous gaseous core systems with respect to neutron and fuel economy, power distribution and heat transfer characteristics.

The description herein is directed to a reactor system of 3000 MWth capacity.

Figure 1:
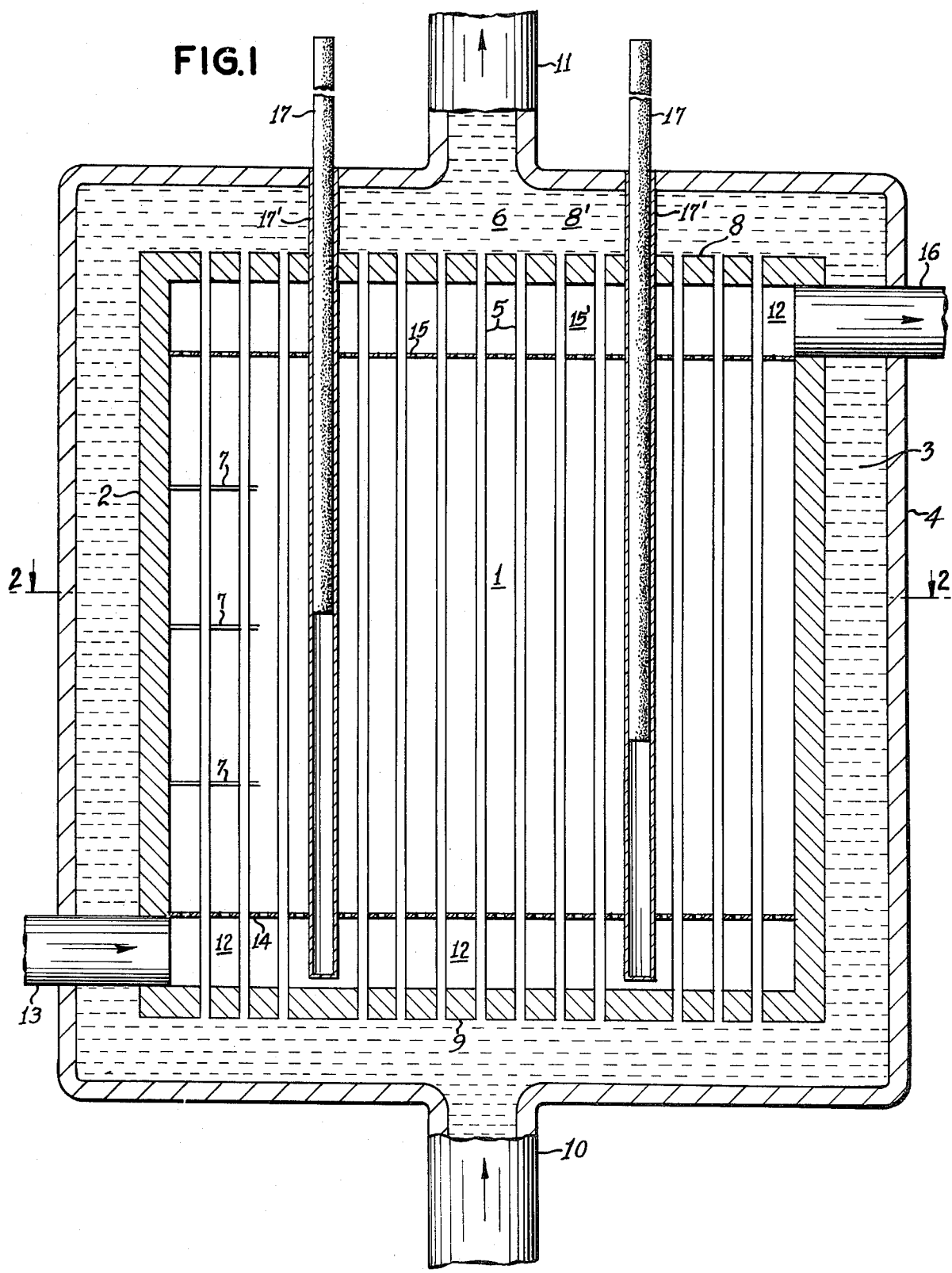
FIG. 1 is a sectional elevational view of a heterogeneous gas core nuclear reactor in accord with the invention.
Figure 2:
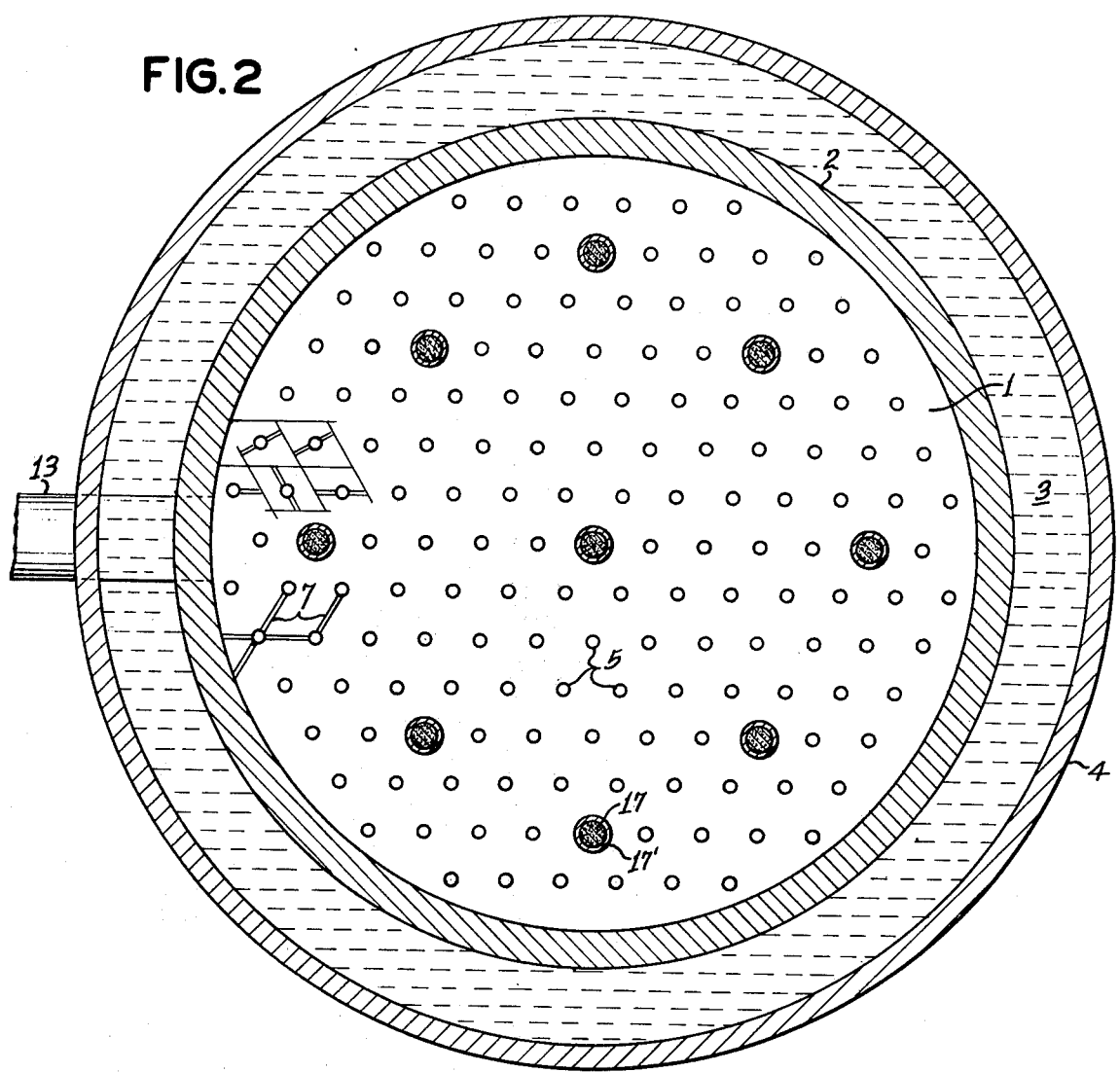
FIG. 2 is a sectional plan view of the reactor taken along line 2—2 of FIG. 1.

As shown in FIGS. 1 and 2, a "square" cylindrical core 1, which may have a diameter of 340 cm. and a height of 360 cm., is surrounded by a niobium alloy (99% Nb and 1% Zr) core barrel or core pressure vessel 2 having walls 15 cm. in thickness. A 40 cm. thick light water reflector filled region 3 is defined between the core barrel 1 and an outwardly surrounding reactor pressure vessel 4. The vessel 4 may be fabricated of 15 cm. thick carbon steel base metal inwardly clad with 0.3 cm. stainless steel cladding.

Figure 3:
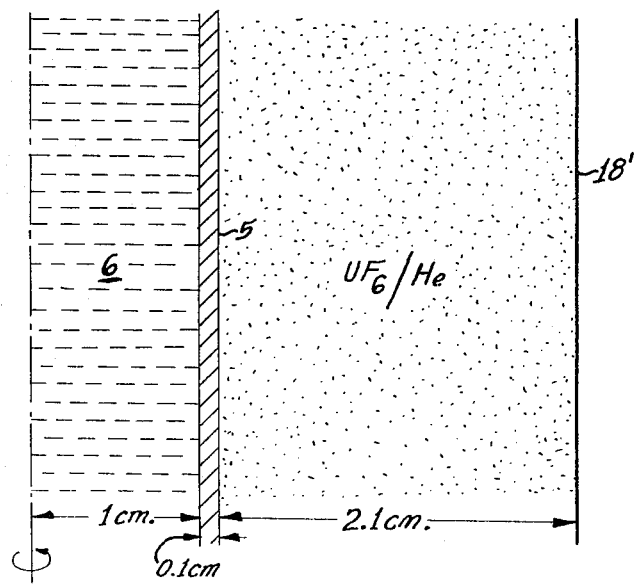
FIG. 3 is a detail sectional half view of a fragment of a tubular channel for the reactor vessel.

The core region contains 2800 cylindrical niobium alloy tubes 5 which carry the light water moderator/coolant 6. The tubes as seen in FIGS. 1, 2 and 3 are of 2 cm. inner diameter and of 0.1 cm. wall thickness. The niobium alloy tubes are supported at intervals along their length by niobium alloy spacers, such as are shown at 7, as necessary to prevent excessive tube motions in the lateral directions. Primary support and orientation for the moderator/coolant tubes is supplied by the core pressure vessel top 8 and bottom plates 9 which serve as headers or manifolds for the light water moderator/coolant.

The light water moderator/coolant inside the Nb-alloy tubes 5 is pressurized to an operating pressure of 75 atm. (1100 psi), and its average operating temperature is 540° K. (512° F.). The light water coolant is made to flow inside the tubes at an average velocity of 20 ft/sec., the coolant flow being in the same direction as the $UF_6$/He flow through the reactor cavity.

The light water moderator-coolant typically removes 32% of the thermal energy generated in the core. The purpose of the parallel flow between the fuel and the water coolant is to reduce the thermal stress in the tubes caused by high temperature differences.

The light water enters the reactor vessel via the inlet header and nozzle 10 at about 483° F. The water is distributed to the reflector and niobium tubes via the lower plate 9, flows upward through the core (or reflector) and exits into the upper coolant plenum 8' above the upper plate 8 at a temperature of about 541° F. The water then leaves the reactor vessel via the outlet header and nozzle 11.

The gaseous fuel medium 12, a mixture of uranium hexafluoride and helium gases, fills the rest of the core cavity. The uranium hexafluoride is 25 weight % enriched in $U^{235}$ and has a partial pressure of 20 atmospheres. The helium partial pressure is 21 atmospheres. Addition of helium to the gaseous fuel improves its thermodynamic, fluid dynamic and heat transfer properties. The average operating temperature of the gaseous mixture in the core is 1010° K. (1359° F.). 68% of the heat generated in core is typically removed by the $UF_6$/He mixture. The average in-core gas velocity is 50 ft./sec.

The $UF_6$/He gas enters the vessel via inlet nozzles, such as nozzle 13. The lower spacer assembly 14 acts as a diffuser plate and distributes the $UF_6$/He which enters the core with a temperature of 971° F. The $UF_6$/He fuel flows upwards through the core into the upper gas plenum 15' above the upper spacer assembly 15. The $UF_6$/He gas then exists the vessel at a temperature of 1747° F. via the outlet nozzles, such as nozzle 16.

The spacer grids 7 may be of any conventional type, such as those shown in FIGS. 2-6 on page 20 of "Systems Summary of a Westinghouse Pressurized Water Reactor Nuclear Power Plant" Copyright 1971, Westinghouse Electric Corporation, PWR Systems Division.

Control rods 17, typically of boron carbide are arranged for adjustable insertion into the gaseous medium in the core vessel to provide minor or major power level control and may be capable of complete shutdown of the reactor. Suitable tubular sheaths 17' are provided distributed in the array of moderator-coolant channels for containing the vertically adjustable rods. Similar control rods may be provided in the reflector region 3 outwardly around the core barrel if desired.

FIG. 3 shows a typical conceptual unit cell for the core of the present invention. The outer radii in FIG. 3 represents the radii of "equivalent" cylindrical unit cells. The unit cell pitch is 6.1 cm.

Figure 4:
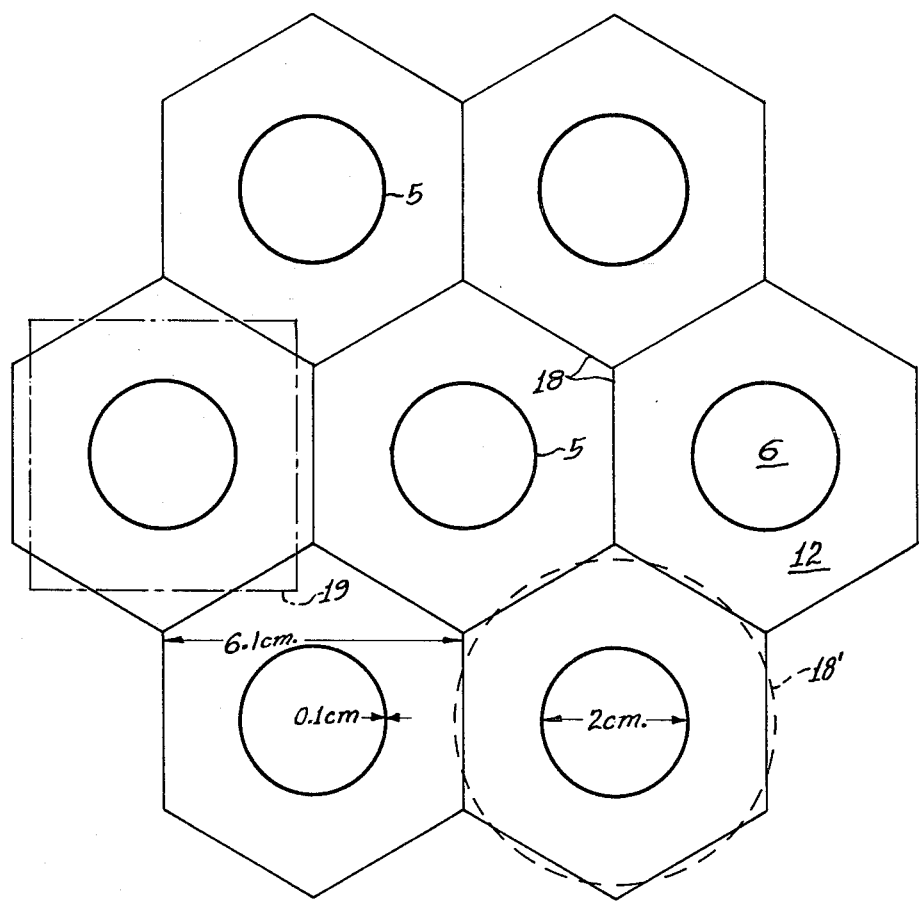
FIG. 4 is a schematic plan view illustrating the arrangement of tubular channels within the core vessel.

FIG. 4 is a schematic plan view of a portion of the array of conceptual hexagonal unit cells of which the conceptual boundaries are shown in solid lines at 18, with the boundaries of "equivalent" conceptual cylindrical unit cell, and a corresponding conceptual rectangular unit cell for the 3000 $MW_{th}$ heterogeneous gas core reactor represented in broken lines at 18' and 19, respectively.

Figure 5:
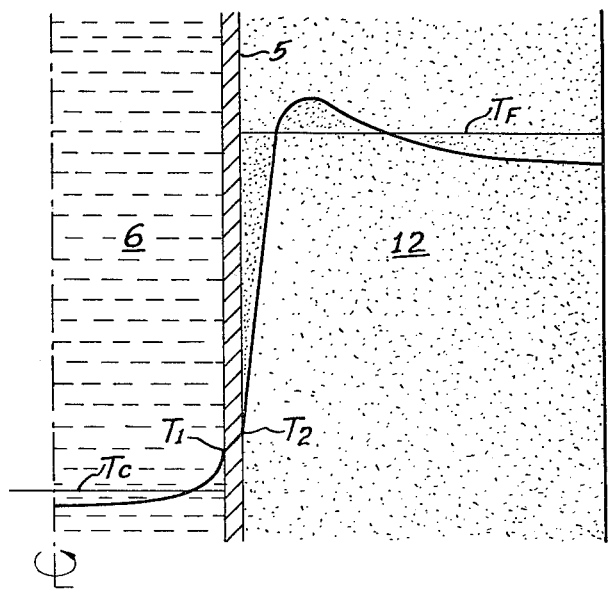
FIG. 5 is a sectional half view similar to FIG. 3 with typical temperatures plotted thereon.

The average temperature profile for a typical unit cell of the 3000 $MW_{th}$ reactor is shown in FIG. 5. The symbols used in this Figure have the following meaning:

$T_C$ = average water coolant bulk temperature, 512° F.
$T_1$ = average inner surface temperature of the niobium tube (water side), 584° F.
$T_2$ = average outer surface temperature of the niobium tube (fuel side), 617° F.
$T_F$ = average fuel bulk temperature, 1359° F.
$\Delta T_C$ = difference between water coolant inlet and outlet temperature in the core, 58° F.
$\Delta T_F$ = difference between fuel inlet and outlet temperature in the core, 776° F.

The capability to remove the fission generated energy from the reactor core is notably better than that from a corresponding size homogeneous gaseous core reactor. This is not only because of the dual heat removal capability by both the moderator/coolant and flowing fuel but also because of the superior in-core heat transfer characteristics and temperature distribution resulting from the core heterogeneity itself.

Shown in FIG. 6 is a simplified schematic diagram of a 1400 $MW_e$ heterogeneous gas core reactor power plant employing a core region in accordance with the described invention. 68% of the thermal energy produced in the core is removed directly by the circulating gaseous fuel and the rest of the heat (32%) is removed via the light water moderator/coolant from the 3000 $MW_{th}$ reactor.

The typical 3000 $MW_{th}$ heterogeneous gas core reactor power plant shown schematically in FIG. 6 comprises a reactor contained in pressure vessel 4 with light water and gaseous medium circuits connected thereto. The light water exit nozzle 11 is connected through a conduit 20 in which the desired pressure is maintained by a pressurizer 21, to a feedwater heat exchanger 22. A light water conduit 23 is connected from the heat exchanger to the inlet nozzle 10 of the reactor vessel. A suitable pump 24 is interposed in conduit 23 to circulate the light water through the light water conduits, the heat exchanger and the reactor.

The gaseous fuel medium circulates from exit nozzle 16 through a conduit 25 to a steam generator heat exchanger 26 from which the gaseous fuel is returned through a conduit 27 and pump 28 to inlet gas nozzle 13 and thence into the reactor.

While only one light water and one gaseous fuel external circuit is shown, it will be apparent to those skilled in the art that several such external circuits are to be preferred. Thus, as indicated at 20' and 23', the light water, and, as indicated at 13' and 16', the gaseous fuel medium preferrably circulate through external steam generating circuits which may be identical to that shown, permitting one or another or several of the power systems to be shut down in accord with the load requirements or to permit repairs, for example, and to permit the use of turbines and generators of economic capacities.

It will be understood that suitable fuel clean up or reprocessing equipment may be provided in one or more external gas circuits. A particular advantage of the system, however, is that little or no plutonium need be extracted from the gaseous medium but may be continuously recirculated in the system.

A steam circuit for driving steam turbine 30 includes a steam conduit 31 connecting steam generator 26 to the high pressure side of the turbine and conduits 32 and 33 from the turbine, the former bleeding a controlled amount of exhaust steam directly from the turbine into feedwater heater 34 and the latter connecting through condenser 35 to provide water to the feedwater heater 34. The water from the feedwater heater passes through pump 36 and conduit 37 to light water—feedwater heat exchanger 22 and thence, through conduit 38, back to the steam generator 26. The gaseous fuel circuit, including the reactor and steam generator, together with the gaseous fuel conduits 25 and 27 should be housed in a protective housing represented at 39.

The temperature of the steam leaving the steam generator in conduit 31 may be substantially 1100° F., the temperature of the water leaving condenser 35 may be 100° F., and the water temperature in conduit 37 entering the light water-feedwater heat exchanger may be 180° F. The water in conduit 38 entering the steam generator may be at 500° F. A summary of design information and parameters for the 3000 MW$_{th}$ heterogeneous gas core reactor based upon the detailed description herein is presented in Table 1.

TABLE 1

| Specifications and Operating Condition for a 3000 MW$_{th}$ H$_2$O-Moderated HGCR | |
|---|---|
| Core Power Rating Core Size | 3000 MW$_{th}$ (1.024 × 10$^{10}$ BTU/hr) Diameter: 340 cm. Height: 360 cm. Volume: 32.69 m |
| Core Barrel | Material: Niobium Alloy (99% Nb. 1% Zr) Thickness: 15 cm. Inner Diameter: 340 cm. |
| Core Moderator/ Coolant Channels | Number of Channels: 2800 Channel (Tube) Material: Niobium Alloy Tube Thickness: 0.1 cm. Inner Diameter: 2 cm. Spacer Grid Material: Niobium Alloy |
| Core Reflector Region | Material: H$_2$O Thickness: 40 cm. |
| Reactor Pressure Vessel | Material: Carbon Steel with Stainless Steel Cladding Inner Diameter: 450 cm. Carbon Steel Thickness: 15 cm. Stainless Steel Clad Thickness: 0.3 cm. |
| Moderator/ Coolant | Material: H$_2$O Pressure: 1100 psia Inlet Temperature to Core: 483° F. Outlet Temperature from Core: 541° F. Average Velocity in Core: 30 ft/sec Pct. of core thermal energy removed by H$_2$O: 32% |
| Fuel Characteristics | Composition: Mixture of He and UF$_6$ gases Inlet Temperature to Core: 971° F. Outlet Temperature from Core: 1747° F. Average Velocity in Core: 50 ft/sec He Partial Pressure: 21 atm UF$_6$ Partial Pressure: 20 atm Uranium 235 Enrichment: 25 wt % Uranium Mass in Core: 1665 kg U235 Mass in Core: 416 kg Pct of core thermal energy removed by He/UF$_6$: 68% |
| Additional Core Characteristics | Average Thermal Neutron Flux: 3.28 × 10$^{14}$ neutrons/cm$^2$ sec |

TABLE 1-continued

| Specifications and Operating Condition for a 3000 MW$_{th}$ H$_2$O-Moderated HGCR | |
|---|---|
| "Equivalent" Cylindrical Cell Dimensions | Average Power Density: 91.77 kw/l Fuel-to-Moderator Ratio (# of atoms of U/# molecules of H$_2$O): 2.575 × 10$^{-2}$ H$_2$O moderator/coolant radial thickness: 1 cm. Niobium alloy coolant tube radial thickness: 0.1 cm. He/UF$_6$ fuel region radial thickness 2.1 cm. |

H$_2$O in the above table refers to light water.

Figure 7:
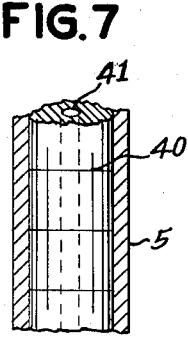
FIG. 7 is a sectional view of a fragment of a moderator tube in accord with a modified embodiment of the invention.

The reactor described specifically hereinabove comprises a circulating moderator coolant, specifically light water. The reactor may, however, as shown in FIG. 7, be provided with solid moderator materials in the tubes 5. Such moderator may comprise graphite blocks 40 stacked in the tube 5, and such blocks may be provided with openings 41 extending therethrough, and aligned from block-to-block, for carrying a coolant gas, for example, helium. Such gas would be circulated through an external circuit in which heat would be extracted. Alternative materials for blocks 40 would include beryllium or beryllium oxide.

The employment of solid moderator materials obviates water handling and avoids any problems of UF$_6$-water reactions.

To enhance neutron economy and breeding potential, plutonium, thorium, or isotopes of uranium other than U$_{235}$ or U$_{238}$ may be added to the gaseous fuel medium. Fluorine or calcium fluoride may be added to the fuel medium to aid in preventing decomposition and to enhance the heat transfer characteristics of the fuel medium.

A reactor in accord with this invention may be operated as a substantially stationary fuel reactor in which the bulk of the gaseous fuel remains in the heterogeneous core cavity, a portion of the gas being bled off for cleanup purposes and then re-injected into the core cavity to maintain the required fissile material inventory, in which case a circulating coolant, such as light water, will be required to remove the heat from the core, or as a circulating fuel reactor, wherein the gaseous fissionable mixture is circulated exteriorly from which the major part of the heat may be extracted, and with some or all of the moderator materials being stationary solids, or, as is described on the preferred embodiment in this application, as a circulating gaseous fuel, circulating fluid coolant reactor, both fuel and coolant being exteriorly cooled, and wherein the coolant preferably also serves as an in-core and out-of-core moderator.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A nuclear heterogeneous gas core reactor comprising a core barrel containing a fissionable gaseous fuel mixture of UF$_6$ and helium free of moderator material, an array of parallel tubes in said barrel outwardly surrounded by said fuel mixture, said tubes being filled with a solid moderator selected from the group consisting of graphite, beryllium, and beryllium oxide, said moderator being free of said gaseous fuel mixture and containing an interior passageway for the circulation of a heat extraction fluid to cool said moderator.

2. The reactor of claim 1 wherein said fissionable gaseous fuel mixture additionally contains fluorine or calcium fluoride.

3. A nuclear reactor of claim 1 wherein said fissionable gaseous fuel mixture is circulated from the interior of said barrel through heat extraction means exterior of said barrel and then recycled to the interior of said barrel.

4. A nuclear reactor of claim 1 wherein said core barrel is surrounded by a reactor pressure vessel and the space between said barrel and said vessel is filled with a moderator material.

5. A nuclear reactor of claim 4 wherein said moderator material is graphite, beryllium, or beryllium oxide which is cooled by the circulation of a heat extraction fluid therethrough.

6. A nuclear reactor of claim 5 wherein said moderator material is a liquid.

7. A nuclear reactor of claim 6 wherein said liquid is water.

8. A heterogeneous gas core reactor comprising a core barrel having a hollow interior with an array of tubes disposed therein characterized in that outside of said tubes in said interior is filled with a fissionable gaseous medium and inside of said tubes is a solid moderator medium.

9. The combination according to claim 8 wherein said gaseous medium comprises a mixture of uranium hexafluoride and helium.

10. The combination according to claim 8 wherein heat extracting means are provided exteriorly of said core barrel and means are provided for circulating said gaseous medium from said interior through said heat extracting means.

11. The combination according to claim 10 wherein said gaseous medium comprises a mixture of uranium hexafluoride and an inert gas.

12. The combination according to claim 11 wherein said gaseous medium additionally contains fluorine or calcium fluoride.

13. The reactor in accord with claim 11 in which said inert gas is helium.

14. The reactor in accord with claim 13 in which the partial pressure within the core of the uranium hexafluoride is substantially 20 atmospheres and of the helium is substantially 21 atmospheres.

15. The combination according to claim 8 wherein said core barrel is surrounded by moderator material.

16. The combination according to claim 15 wherein said moderator material surrounding said core barrel is graphite, beryllium, beryllium oxide, or water.

17. A nuclear heterogeneous gas core reactor comprising a core barrel constituting containing means for and being filled with fissionable gaseous fuel medium free of moderator, an array of tubes in said barrel outwardly surrounded by said fuel medium and constituting separate containing means for and being filled with a solid moderator medium free of said gaseous fuel, heat extraction means exteriorly of said barrel, and fluid circulating means comprising said heat extraction means for cooling one of said media.

18. A nuclear heterogeneous gas core reactor comprising a core barrel constituting containing means for and being filled with fissionable gaseous fuel medium, an array of tubes in said barrel outwardly surrounded by said fuel medium and constituting separate containing means for and being filled with solid moderator medium, heat extraction means exteriorly of said barrel, and means for circulating said fuel medium from its containing means in said barrel through said heat extraction means and back into said containing means.

19. The combination according to claim 17 wherein said solid moderator medium is provided with a coolant channel therethrough, wherein a coolant fluid is contained in said channel, and wherein said fluid circulating means circulates said coolant fluid.

20. The combination according to claim 19 wherein said coolant fluid is helium.

* * * * *